United States Patent Office 3,333,567
Patented Aug. 1, 1967

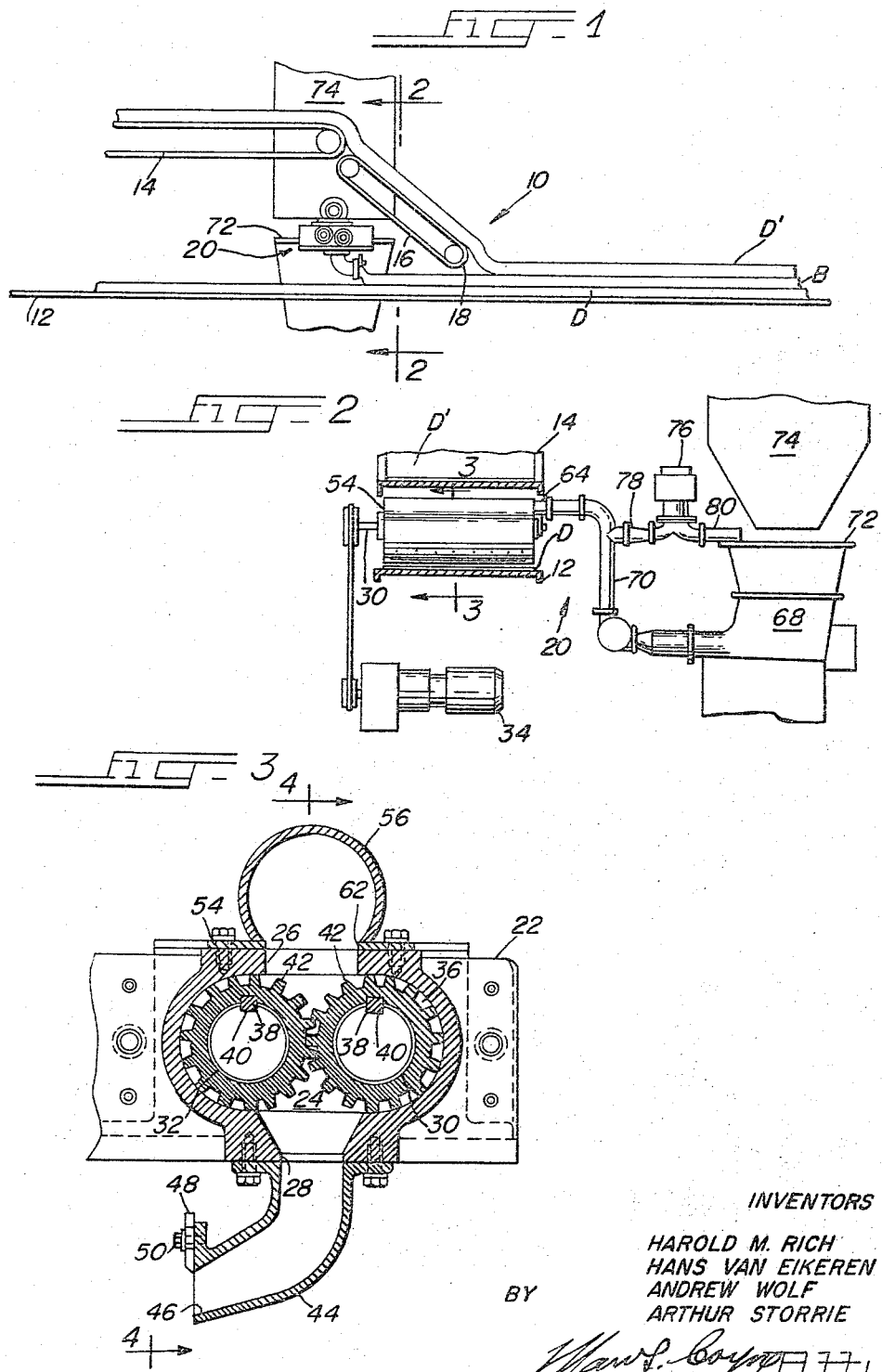

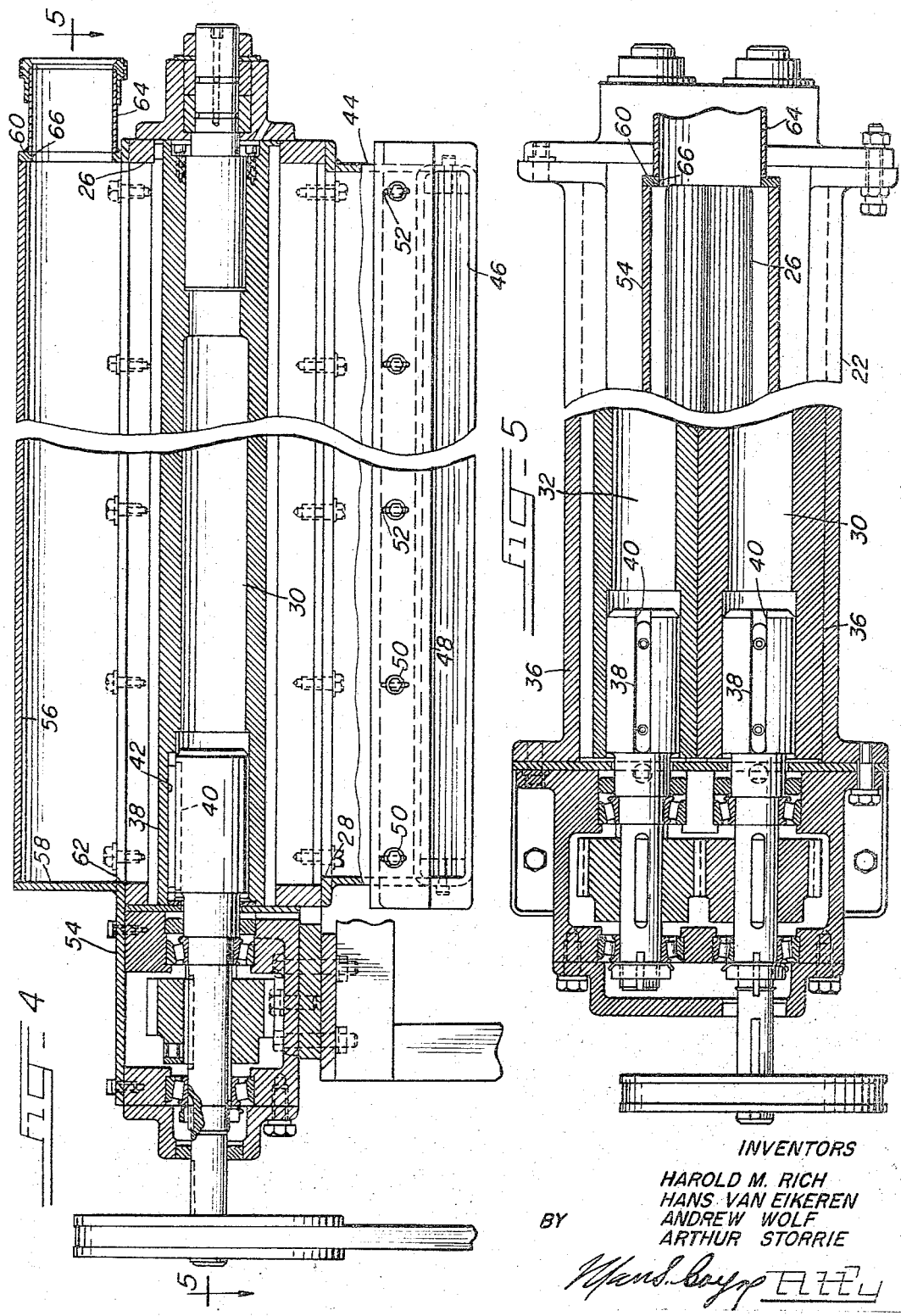

3,333,567
BUTTER EXTRUDER
Harold M. Rich, Northbrook, Andrew Wolf, Deerfield, Hans Van Eikeren, Lincolnwood, and Arthur Storrie, Chicago, Ill., assignors to Kitchens of Sara Lee, Inc., Chicago, Ill., a corporation of Maryland
Filed Feb. 12, 1965, Ser. No. 432,137
4 Claims. (Cl. 118—24)

This invention relates generally to the automated and mass production baking of Danish type pastry and more particularly to an apparatus and method for continuously extruding butter or the like in consistent sheet form as is required in the manufacture of such pastry.

In general, Danish type pastries are made from a rich Danish dough structure comprising two layers of dough and a layer of shortening therebetween. As is well known, the shortening most frequently comprises butter which has been mixed with other ingredients such as eggs, sugar, flour, flavorings, etc. When baking in the home or in limited quantities, the preparation of the layered dough structure is a relatively simple matter because the mixture may be spread on by hand. However, in commercial or mass production baking, the manual application of the butter mixture is objectionable for a number of obvious reasons, including prohibitive cost and lack of quality control. Despite the desirabiliy of such means, however, we are unaware of any practical means for automatically and continuously spreading a sheet or layer of the butter mixture. Thus, to our knowledge, this operation is still being performed most inefficiently by hand in even the largest commercial bakeries.

Those skilled in the art will appreciate the heretofore insurmountable difficulties attendant the automatic handling of butter or butter mixtures as described. In order to insure a bakery product of substantially uniform characteristics and quality, the laying of the butter must be made under absolute weight control. The butter mixture layer must be of uniform density and thickness, and all weeping, tears or breaks in the layer must be avoided. All of these requirements are of course totally inconsistent with the physical nature of butter which has an extremely high viscosity and generally is not uniformly consistent throughout. The proper handling of butter mixtures such as are employed in Danish pastry is further complicated by the fact that the mixture has been somewhat leavened by air during the mixing of the butter with the other ingredients.

It is therefore an important object of this invention to provide an apparatus and method for automatically extruding butter or the like into a continuous sheet or layer which overcomes all of the problems described hereinabove.

Another object of the invention is to afford an extruding apparatus and method of the character described which produce a sheet of butter or the like that is continuous and of substantially uniform weight, thickness and consistency throughout.

A further object is to provide an extruding apparatus and method of the character described which produce a sheet of butter or the like that is free of all tears, breaks or openings therein.

Still another object is to afford an extruding apparatus and method of the character described in which the thickness of the sheet produced may be varied and adjusted as desired.

Yet another object is to provide an extruding apparatus and method of the character described which are capable of operating at high capacities and speeds for use in modern assembly line operations.

Still a further object is to afford a completely automated method of making layered dough structures of the type under consideration.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

FIGURE 1 is a fragmentary side elevational view of an automated assembly line embodying the principles of the invention and showing the relationship of the butter extruding apparatus and the manner in which the layered dough structure is formed;

FIG. 2 is a fragmentary sectional view taken on the plane of line 2—2 in FIG. 1 and viewed in the direction indicated;

FIG. 3 is an enlarged sectional view taken on the plane of line 3—3 in FIG. 2 and viewed in the direction indicated;

FIG. 4 is a broken sectional view taken substantially on the plane of irregular line 4—4 in FIG. 3 and viewed in the direction indicated; and FIG. 5 is a broken sectional view taken substantially on the plane of irregular line 5—5 in FIG. 4 and viewed in the direction indicated.

Referring first to FIG. 1 of the drawings, it will be seen that the reference numeral 10 indicates generally an automated assembly line embodying the principles of the invention. The assembly line 10 comprises a lower conveyor such as 12 and an upper conveyor such as 14 positioned thereabove. As indicated, the upper conveyor 14 includes a downwardly sloping segment 16 and terminates at a point 18 intermediate the ends of the lower conveyor 12. Both conveyors travel in the same direction, or to the right as illustrated in FIG. 1.

Positioned rearwardly of the terminus 18 is a butter extruding apparatus indicated generally by the numeral 20, portions of said apparatus being positioned above and overlying the lower conveyor 12 (see FIG. 2). The apparatus 20 comprises a pump housing 22 having a central bore 24 which opens at the top thereof in an elongated inlet opening 26 and at the bottom thereof in an elongated outlet opening 28 (see FIGS. 3–5). A pair of shafts 30 and 32 is rotatably journalled in the pump housing 22, and the shaft 30 is connected to a power source such as a motor 34 so that the same functions as a drive shaft. A gear pump 36 is rigidly mounted on each of the shafts 30 and 32 by any suitable means such as the keys 38 and slots 40 as illustrated in FIG. 3. The gears 42 of pump 36 intermesh and those skilled in the art will appreciate that when the drive shaft 30 is rotated (clockwise in FIG. 3), the gears cooperate to pump any plastic mass within bore 24 out through the outlet opening 28.

Connected to the housing 22 and communicating with the outlet opening 28 is an extruder nozzle 44. The nozzle 44 may be arcuate in cross section as illustrated in FIG. 3, and the same terminates in an elongated nozzle opening 46 which is substantially equal in length to the width of the lower conveyor 12. An elongated blade 48 is mounted on the upper edge of the nozzle opening 46, and the same completely traverses said opening (see FIG. 4). Suitable means such as the bolts 50 and vertical slots 52 is provided so that the position of the blade with relation to the nozzle opening may be adjusted vertically. It will thus be appreciated that the height of the nozzle opening 46 may be varied as desired by adjusting the position of the blade 48.

A pressure or manifold housing 54 is mounted on the top of the housing 22 and communicates with the bore 24 through the inlet opening 26. The manifold housing 54 comprises a dome-shaped or annular top wall 56 and a pair of end walls 58 and 60. The housing 54 is provided with an elongated bottom opening 62 which is in registry with the inlet opening 26 for reasons which will become apparent as the description proceeds. Secured to the wall 60 is an input neck 64 which communicates with the interior of the housing 54 through an opening 66 formed in said wall.

Supply means such as 68 is connected to the input neck 64 of the manifold housing 54 by a suitable supply line such as 70 (see FIG. 2), for purposes of supplying the butter or butter mixture to said housing. In the embodiment illustrated, the supply means 68 comprises an open-topped vessel 72 which contains a twin auger feed pump (not shown) of a type well known to those versed in the art. The butter mixture may be fed into the vessel from an overhead hopper 74 shown fragmentarily in FIG. 2.

Completing the extruding apparatus 20 is an overflow or back pressure valve 76. The back pressure valve 76 communicates with the supply line 70 through a tube 78, and a tube 80 projects from the valve back over or into the supply vessel 72.

Operation of the butter extruding apparatus 20 may now be appreciated in connection with following description. As the butter or butter mixture is fed into the supply vessel 72, the same is pumped through the supply line 70 into the manifold housing 54. The supply means 68 continues to pump the butter into the manifold housing until said housing is completely packed therewith and a predetermined pressure is attained. Upon attainment of the predetermined pressure, the back pressure valve 76 is caused to operate to permit excess butter to be diverted from the manifold housing and back into the supply vessel 72. It will thus be appreciated that the manifold housing is constantly fully packed with butter under a constant predetermined pressure. This is quite important because it results in a plastic mass which is always of the same consistency.

The butter mixture in the manifold housing 54 of course enters the pump housing 22 through the aligned openings 26 and 62. Since the openings 26 and 62 are substantially coextensive with the gear pump 36, the cavity 24 is likewise continuously completely filled with plastic mass under the same conditions of pressure and consistency existing in the manifold housing. Operation of the gear pump 36 thus results in the extrusion of a continuous and uniformly consistent sheet of the butter out through the nozzle opening 46. The thickness of the extruded butter sheet may of course be controlled by adjustment of the blade 48.

Turning once again to FIG. 1 of the drawings, the completely automated method of making layered dough structures may now be appreciated. It will thus be seen that a first continuous sheet of dough D is positioned upon and moved by the lower conveyor 12. As the sheet D passes beneath the extruding apparatus 20, said apparatus causes a continuous sheet of butter or butter mixture B to be deposited upon and substantially completely cover the dough sheet D. At the same time, a second continuous sheet of dough D' is positioned upon and moved by the upper conveyor 14. When the dough sheet D' reaches the terminus point 18, it is deposited upon and substantially completely covers the butter sheet B. The layered structure D-B-D' now continues along the conveyor 12 for whatever further operations thereon may be required.

From the foregoing description and drawings, it should be apparent that we have provided a novel method and apparatus for extruding in consistent sheet form plastic masses such as butter and the like. The supply, pump and nozzle arrangement, in association with the maintenance of the manifold housing at fully packed constant pressure conditions insures that the extruded sheet of butter is uniformly consistent and free of all tears, breaks, holes, etc. As a result, layered dough structures of the type required in Danish pastries may be most efficiently and completely automatically made for mass production operations.

It is believed that our invention, its mode of construction and assembly, and many of its advantages should be readily understood from the foregoing without further description, and it should also be manifest that while a preferred embodiment of the invention has been shown and described for illustrative purposes, the structural details are nonetheless capable of wide variation within the purview of our invention as defined in the appended claims.

What we claim and desire to secure by Letters Patent of the United States is:

1. Apparatus for extruding butter or the like comprising
    a pump housing,
    pump means in said pump housing,
    an extruder nozzle connected to said pump housing and communicating with the interior thereof,
    a manifold housing connected to said pump housing and communicating with the interior thereof,
    supply means for continuously supplying said butter or the like to said manifold housing and fully packing said housing therewith, and
    pressure by-pass means associated with said manifold housing for diverting therefrom said butter or the like to maintain the packed butter or the like therein under constant predetermined pressure.

2. The apparatus of claim 1 in which said pump means comprises a pair of intermeshing gears rotatably journalled in said pump housing.

3. Apparatus for extruding butter or the like in continuous sheet form comprising
    a pump housing having a central cavity therein,
    a pair of intermeshing gears rotatably journalled in said cavity,
    a manifold housing connected to said pump housing and communicating with said central cavity,
    an auger feed pump connected to said manifold housing for continuously packing said manifold housing full with said butter or the like,
    a back pressure valve connected to said manifold housing for maintaining said butter or the like in said manifold housing under constant predetermined pressure,
    an extruder nozzle having an elongated opening connected to the bottom of said pump housing and communicating with said central cavity,
    an elongated blade connected to the upper edge of said opening and adapted for completely traversing said opening,
    said blade being formed with a plurality of bolt receiving vertical slots so that the vertical position thereof may be adjusted to vary the thickness of said sheet being extruded from said opening, and
    a conveyor positioned beneath said nozzle opening.

4. Apparatus for extruding butter or the like comprising:
    a pump housing,
    pump means in said pump housing, an extruder nozzle connected to said pump housing and communicating with the interior thereof, a manifold housing connected to said pump housing and communicating with the interior thereof, supply means for continuously supplying said butter or the like to said manifold housing and fully packing said housing therewith, pressure means associated with said manifold housing for maintaining the packed butter or the like therein under constant predetermined pressure, said extruder nozzle terminating in an elongated opening so that the butter or the like is extruded therefrom in continuous sheet form, a blade connected to said nozzle and adapted to extend across said opening, and adjustment means for adjusting the positioning of said blade with relation to the height of said opening whereby the thickness of the sheet of butter or the like extruded therefrom can be varied.

References Cited

UNITED STATES PATENTS

| | | | |
|---|---|---|---|
| 1,641,403 | 9/1927 | Van Derhoef | 118—325 X |
| 1,973,778 | 9/1934 | Price | 118—324 X |
| 2,130,689 | 9/1938 | Leary | 118—410 |
| 2,624,115 | 11/1941 | Grainger et al. | 107—1 X |
| 2,627,825 | 2/1953 | Stiles | 107—54 |

WALTER A. SCHEEL, *Primary Examiner.*

J. SHEA, *Assistant Examiner.*